United States Patent [19]

Winter et al.

[11] 4,274,569
[45] Jun. 23, 1981

[54] LUGGAGE CASE AND VEHICLE RACK THEREFOR

[75] Inventors: Roger D. Winter, Lakewood, Colo.; John P. Sarbell, Norcross, Ga.

[73] Assignee: Samsonite Corporation, Denver, Colo.

[21] Appl. No.: 75,405

[22] Filed: Sep. 14, 1979

[51] Int. Cl.³ .............................................. A45F 1/16
[52] U.S. Cl. .................................. 224/319; 224/315
[58] Field of Search ............... 224/315, 309, 319, 324, 224/328; 190/60, 41 R

[56] References Cited

U.S. PATENT DOCUMENTS

| | | | |
|---|---|---|---|
| 2,372,845 | 4/1945 | Nelson | 190/60 |
| 3,209,971 | 10/1965 | Goodell | 224/319 |
| 3,366,295 | 1/1968 | Nygaard | 224/319 |
| 3,861,572 | 1/1975 | Norris et al. | 224/315 |

*Primary Examiner*—Steven M. Pollard
*Attorney, Agent, or Firm*—George J. Netter

[57] ABSTRACT

A luggage case has one or more grooves in its sidewall. First and second mutually spaced mounting apparatus are affixed to the same sidewall. A vehicle mounted rack includes parts of such geometry and dimensions as to enable fitting receipt within the luggage case groove. First retention apparatus has an open groove within which the first luggage case mounting apparatus is slidingly received. Second retention apparatus is located spaced from the first and has a spring-loaded member for resiliently receiving the luggage case second mounting apparatus.

The spacing and location of the various parts on the case and rack are such as to enable them to be simultaneously cooperatively engaged. In this manner, the luggage case is secured to the rack and preventing its movement in any direction. A key operated lock insures against theft of the case from the rack.

20 Claims, 9 Drawing Figures

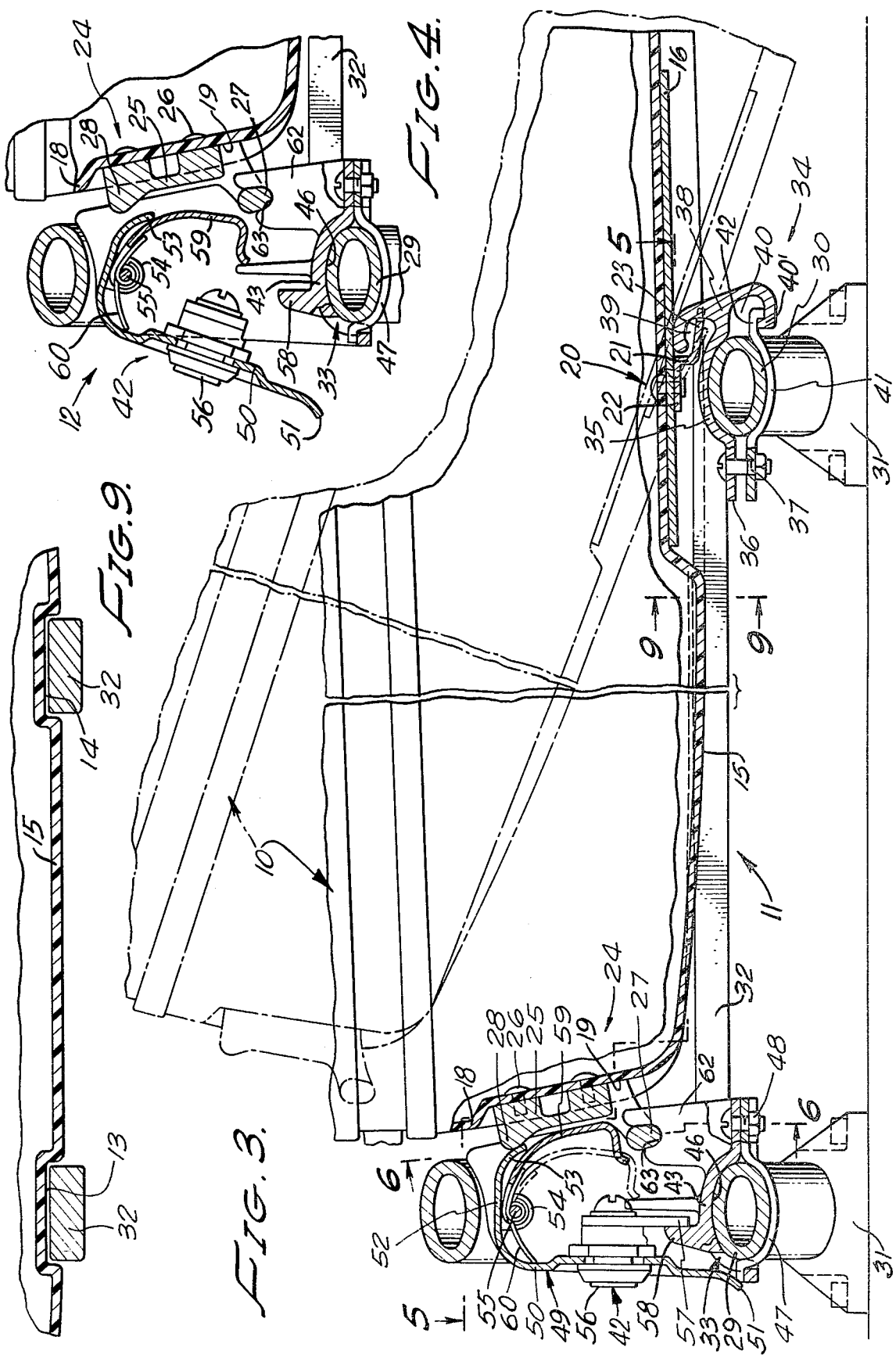

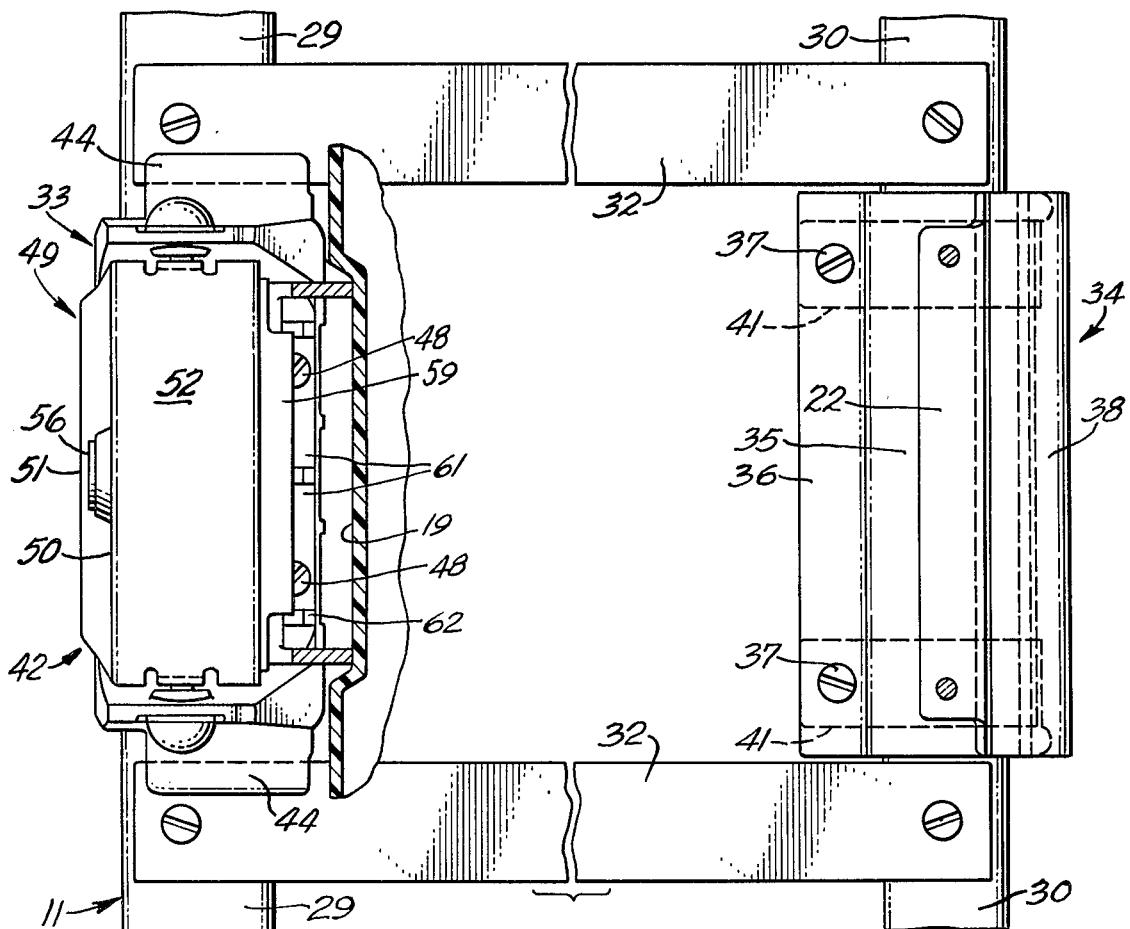
FIG. 5.
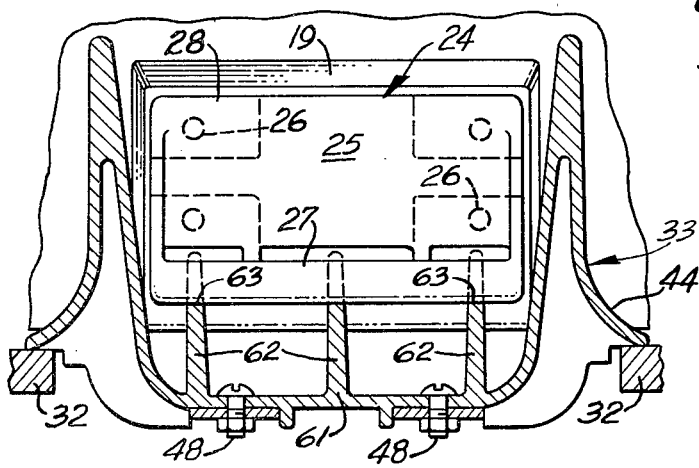
FIG. 6.
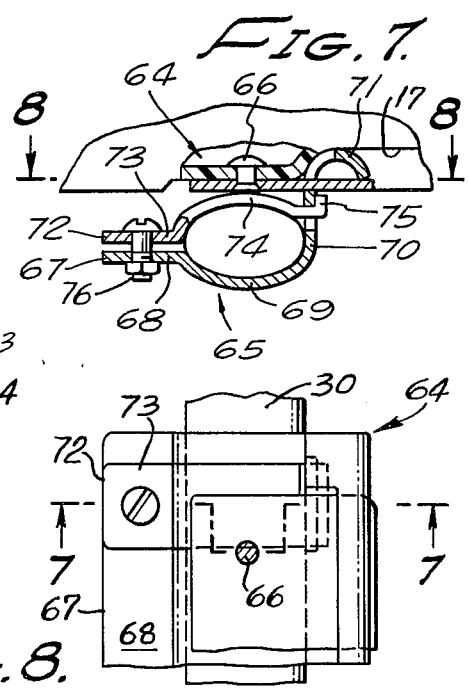
FIG. 7.
FIG. 8.

LUGGAGE CASE AND VEHICLE RACK THEREFOR

The present invention relates generally to a luggage case and vehicle mounting rack therefor, and, more particularly, to such a luggage case and mounting rack that is especially useful for application to an external surface of a vehicle.

BACKGROUND OF THE INVENTION

A significant proportion of present day automotive vehicles are of relatively small size and do not, therefore, have as much internal storage space as do the more conventional sized automobiles. In addition, as a result of increasing energy shortages, it is believed the proportion of smaller automotive vehicles will increase in the future and, therefore, this will give rise to an ever increasing need for means of increasing the storage capacity of the vehicle for such things as luggage, for example. There have, of course, been various approaches in the past to attaching luggage or other containers to the exterior of the automobile, the most popular of which at this time appears to be providing a frame directly mounted to the automobile roof or to the rear trunk lid and to which luggage and other items are strapped or otherwise tied or secured. These securing devices are not part of either the mounting rack or the luggage items and frequently break or otherwise become disengaged from the luggage items with obvious undesirable results. Also, of course, ropes, straps and the like do not prevent unwarranted tampering with the luggage or its theft.

U.S. Pat. No. 3,202,332, LUGGAGE CARRIER, by K. K. Walker, issued Aug. 24, 1965, describes a luggage carrier which is attached to the rear bumper of an automobile and can be swung away from the bumper and rear of the automotive vehicle when access to the trunk is desired. U.S. Pat. No. 3,907,184, ROOF-TOP CONTAINER, by James E. Zane, issued Sept. 23, 1975, concerns a container device attached to the roof of a passenger automobile by means secured to rails affixed to the top of the automotive vehicle and within which container device, luggage or the like are located thereby protecting them from both weather and theft.

OBJECTS AND SUMMARY OF THE INVENTION

A primary aim and object is the provision of a luggage case having mounting parts which cooperate with retention means on a vehicle mounted rack enabling rapid securement and disengagement of the luggage case to the rack.

Another object is the provision of a luggage case with mounting means integrally incorporated therein which are snappingly engageable with retention means on a vehicle mounted rack and can only be disengaged by unlocking.

Yet another object is the provision of a luggage case and vehicle rack as in the above objects, in which the luggage case sidewall includes grooves for fitting receipt of rack parts therein to position and maintain the luggage case in fixed orientation.

In the practice of the present invention, a luggage case includes one or more grooves formed into the case sidewall. First and second mutually spaced mounting means are affixed to the same luggage case sidewall including the grooves.

A rack conveniently mounted either on the roof of the vehicle or on the outer surface of the trunk lid, for example, includes parts of such geometry and dimensions as to enable fitting receipt within the luggage case sidewall groove/s. A first retention means has an open groove within which the first luggage case mounting means is slidingly received. A second retention means is located spaced from the first retention means, has a spring-loaded member for resiliently receiving the luggage case second mounting means therewithin and securing them together.

The spacing and location of the first and second retention means are such as to enable both luggage case mounting means to be simultaneously secured within the retention means and as well the grooves in the luggage case sidewall receive the rack parts therewithin. In this manner, the luggage case is secured to the rack and preventing its movement in any direction. A key operated locking means is provided on the second retention means for releasing the luggage from the rack.

DESCRIPTION OF THE DRAWING

FIG. 3 is a sectional elevational view taken along the line 3—3 of FIG. 2.

FIG. 4 is a sectional elevational view taken through the locking and retention means shown with the parts engaged and the retention means inoperative.

FIG. 5 is a sectional plan view taken along the line 5—5 of FIG. 3.

FIG. 6 is a front elevational view taken along the line 6—6 of FIG. 3.

FIG. 7 is a sectional elevational view of an alternate embodiment of one of the retention means taken along the line 7—7 of FIG. 8.

FIG. 8 is a plan sectional view of the alternate embodiment of FIG. 7 taken along the line 8—8 of FIG. 7.

FIG. 9 is a sectional elevational view showing the interfitting relationship of luggage case wall and rack.

DESCRIPTION OF PREFERRED EMBODIMENTS

Figure 1:
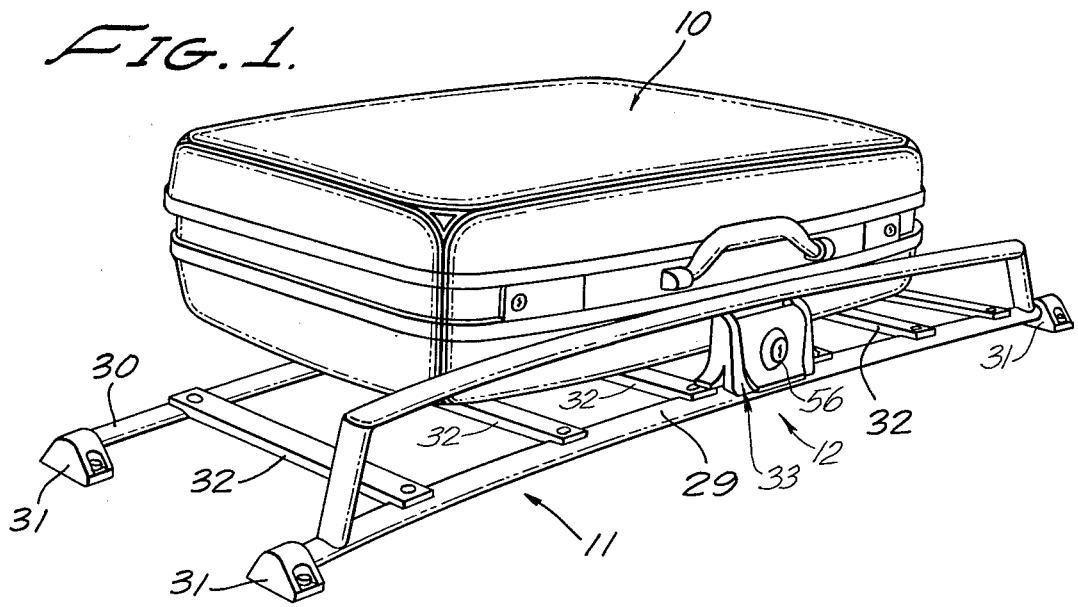
FIG. 1 is a perspective view of a luggage case and rack of the invention shown cooperatively engaged.

Turning now to the drawings and particularly FIG. 1, a luggage case 10 modified in accordance with the present invention is shown mounted onto a rack assembly 11, the latter being, in turn, secured to the roof or the rear trunk lid of an automotive vehicle. Although the invention may be practiced with other types and forms of suitcases or luggage 10, it is especially advantageous with a luggage case of the so-called hardside construction having molded plastic sides interconnected by metal frame members.

Without reference to details at this time, with the rack 11 suitably affixed to the vehicle outer surface there are retention means on the rack which coact with mounting members carried on one side of the luggage case 10 providing rapid locking engagement between the two not requiring the use of ropes, straps, buckles or the like. As will be described, the engagement is such as to secure the luggage case in a fixed orientation with respect to the vehicle and maintain it tightly and firmly in that relationship even on experiencing vibrations and shocks customarily encountered on movement of the automotive vehicle along a roadway or elsewhere.

Once the luggage case is lockingly engaged with the rack, it is securely maintained thereto until the locking means 12 is actuated to release it thereby securing the luggage not only against inadvertent falling off the rack, but also from theft.

As seen best in FIG. 9, one side of the luggage case which carries mounting means to be described, is modified during fabrication from the normal smooth, flat-sided condition. Thus, a pair of spaced apart, generally parallel grooves 13 and 14 are molded in the sidewall 15 to extend across a substantial extent from the handle side or top wall of the cap to the lower or bottom wall. Adjacent the bottom wall side and extending completely throughout the space between the two tracks 13 and 14, there is a molded well 16 somewhat deeper than the grooves. An interconnecting groove 17 extends between the two grooves 13 and 14 at substantially the same depth.

The top wall 18 of the same luggage half-shell includes an enlarged molded well 19 lying substantially midway between the two grooves 13 and 14.

A first mounting means 20 includes a generally rectangular metal plate formed to have a shoulder 21 along substantially its center line which separates the plate into two parallel, rectangular portions spaced from each other by the shoulder. The one rectangular portion 22 is affixed to the sidewall in the well 16 by rivets or threaded means as desired, with an outer edge of the second rectangular portion 23 being spaced from the well wall and substantially parallel to the case sidewall.

A second mounting means 24 (FIGS. 3 and 4) includes an elongated base 25 which is affixed to the case top wall defining the well 19 by threaded members 26. A rodlike member 27 integral with base 25 is located along a base edge extending parallel to the case sidewall and lying outwardly somewhat from the base outwardly-directed surface. The opposite side of the base has rounded ridge 28 parallel to the rodlike member and extending outwardly from the base major surface.

Although the first and second mounting means 20 and 24 extend outwardly somewhat from the luggage walls, it is not to the point that they would in any way impair use of the luggage case in its normal use. Also, since the means 20 and 24 are both located recessed below the sidewall and top wall outer surface within wells, this reduces the possibility of inadvertent and undesirable contact with these parts during normal use of the luggage case when disengaged from the rack.

With reference now simultaneously to FIGS. 1 and 3, the rack 11 is seen to include a pair of metal tubes 29 and 30 arranged in spaced parallel relation to one another, the ends of which are received in stanchions 31 anchored to the surface of the vehicle as desired. The metal tubes may be formed longitudinally into a slight arc with the concavity facing the vehicle, to accommodate the vehicle surface curve. A plurality of substantially rectangular support bars 32 extend between the tubes in a mutually spaced relationship and collectively form a surface on which the luggage case or other items can be mounted. The spacing between the two centrally located support bars 32 is such as to enable receipt within the two parallel grooves 13 and 14 in the luggage case sidewall (FIG. 9) when the luggage case is locked onto the rack. A generally U-shaped bracket 33 is affixed to the upper surface of the tube 29 with the crossbar arranged parallel to the tube.

For the detailed description of the first retention means 34 reference is made to FIG. 3. As shown there, the means 34 has a first clamping member 35 with a central portion that conforms to the curvature of tube 30, a flat portion 36 extending beyond the tube and having an opening through which a threaded member 37 passes, and a generally T-shaped part 38 extending past the tube on the opposite side. The arms of the T-shaped part are formed back toward the tube in two elongated hooklike grooves or recesses 39 and 40.

A second clamping member 41 has curved central section conforming to the tube, a flat outer end through which threaded member 37 passes, and the opposite end extending outwardly of the tube formed into a hook 42 which interlocks with hook 40'. Tightening the threaded member causes the members 35 and 41 to clamp about tube 30 presenting a groove 39 facing generally toward the tube 29 and extending along the tube 30. As will be discussed, the groove 39 receives the edge of the luggage case first mounting means and retains it during the locked mode.

Figure 2:
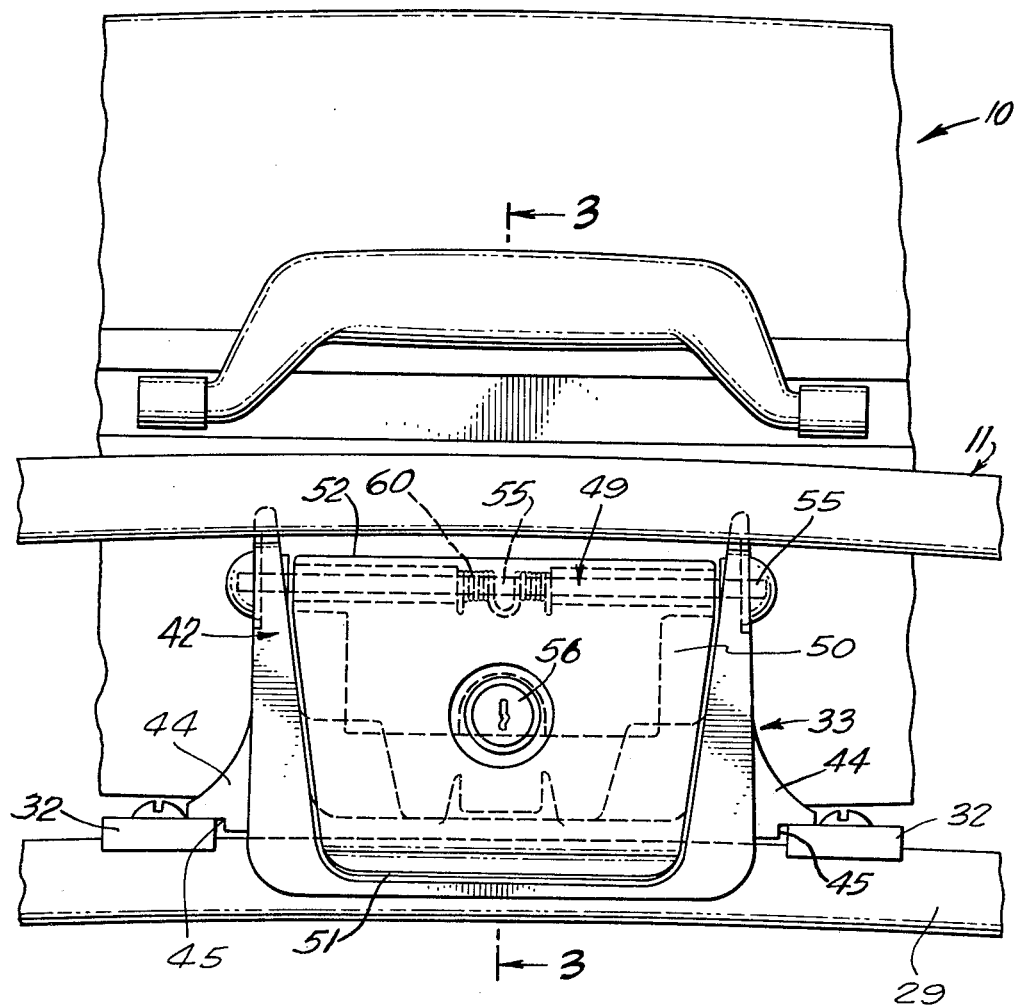
FIG. 2 is a front elevational, partially fragmentary view of the rack and luggage case shown secured together.

Reference is now made to FIGS. 2 through 4 for the description that follows of the retention and locking means 42. A generally U-shaped base 33 has its crossbar 43 outer surface contoured for fitting receipt on the tube 29. The outer sides of the base arms each include a triangular reinforcing member 44 affixed thereto with a shoulder 45 formed in the lower surface for engaging the top corner edge of a support bar 32. As seen best in FIGS. 3 and 4, the base 43 contoured lower surface 46 is secured to the tube 29 by a metal clamp 47 having one hooklike end received through an opening in the base and its other end anchored to the base by a nut and bolt assembly 48. Two clamps 47 are actually used, one immediately adjacent each base arm.

A front rocker plate 49 has a relatively flat faceplate 50 dimensioned to enable receipt between the base arms enclosing that space and with an outwardly radiused lower edge 51. A top portion 52 is formed at substantially ninety degrees to the faceplate 50 and terminates in a downwardly curved back edge margin 53. Two mounting ears 54 extend downwardly from each end of the top portion 52 and include an opening through which a shaft 55 passes, the ends of the latter being secured within the top end parts of the U-shaped base arms (FIG. 2).

Centrally located within the faceplate 50 is a key-operated lock 56 which in the locked position locates a detent arm 57 in obstructing relation to a raised portion 58 on the base 43 crossbar preventing the faceplate from being opened. When the lock is rotated ninety degrees moving the detent arm away from raised portion 58, the faceplate 50 may be opened as shown in FIG. 4.

A back rocker plate 59 is formed into a shallow C-shape with its upper edge rolled into a journal for receipt onto the shaft, and its lower edge margin formed inwardly at substantially ninety degrees to the main plate body. A coil spring 60 mounted on the shaft 55 has parts engaging the inner surface of the back rocker plate and other parts contacting the inner surface of the front rocker plate resiliently urging the two rocker plates away from each other.

Affixed to the lower inside surface of the U-shaped base 43 is support means 61 for the rodlike member 27 including three vertically extending stanchions 62 the upper ends of which are slotted as at 63 to receive the member 27 therein (FIG. 3). It is to be noted that the lower end part of the back rocker plate 59 is spaced slightly beyond the slotted ends of stanchions 62 when the faceplate is locked.

With respect to operation of the invention described to this point, assume the retention and locking means 42 is in the locked mode as shown in the solid line depiction of FIG. 3. The luggage case 10 is then placed on the rack 11 with the lower edge of the luggage case first mounting means 20 received within the groove or recess 39 of the rack first retention means 34. At this time, the luggage case is angularly disposed to the rack (dashed-line depiction of FIG. 3) and the grooves 13 and 14 are aligned directly over the centrally located support bars 32. Next, the second mounting means 24 is moved downwardly toward the first retention until the rodlike member 27 moves the back rocker plate 59 toward the front rocker plate 49 (dashed-line showing, FIG. 3) and the rodlike member is seated in the stanchion slots 63. When this has been accomplished, the back rocker plate 59 moves under spring action to the solid-line position above the rodlike member 27 securing it within the slots 63. The luggage case is now locked to the rack and the rack support bars 32 are fitted in the grooves 13 and 14 (FIG. 9). It is important to note that in the locked mode the raised ridge 28 is in flush contact with the top portion of the front rocker plate and the main body portion of the second mounting means 24 covers the back rocker plate preventing unlocking by the expedient of opening the back rocker plate.

When it is desired to remove the luggage case from the rack, the lock 56 is unlocked with the key and the faceplate 50 pulled away from the rack (FIG. 4). The luggage case second mounting means 24 can now be lifted away from the retention and locking means 42, after which the luggage case first mounting means 20 may be disengaged from the rack first retention means 34.

For the ensuing description of an alternate embodiment of first mounting means 64 and first retention means 65 simultaneous reference is made to FIGS. 7 and 8. The first mounting means 64 is essentially a rectangular metal plate having one edge margin affixed to the case wall defining the interconnecting groove 17 by a plurality of rivets 66, the remainder of the plate extending over and spaced from the well 16 bottom wall.

The alternate version 65 of first retention means includes a first metal clamp half 67 having a flat end portion 68, a central portion 69 contoured for receipt on the lower part of tube 30, a portion 70 formed at ninety degrees to 69 and extending beyond the tube 30, and a further end portion 71 radiused by forming it away from the tube and clamp portion 70. A second metal clamp half 72 includes a flat portion 73 matching 68 of the clamp half 67, a central contoured portion 74 fitted over the top of tube 30, and a hooklike end 75 which passes through an opening in the portion 70 of first clamp half 67 locking them together. A nut and bolt 76 secures the flat portions 68 and 73 together the clampingly engages the two clamp halves about the tube 30.

We claim:

1. Apparatus for releasably mounting a luggage case onto a rack, comprising:
   plate means mounted onto an outer surface of the luggage case having an edge spaced from said case surface;
   a rodlike member mounted on the luggage case outer surface and spaced along said surface from said plate;
   an outer surface of the luggage case including an elongated groove;
   the rack having a support member fittingly received within the luggage case groove, and said rack further including securing means having,
   first retention means with a slot into which the plate edge is received, and
   second retention means clampingly engaging the rodlike member, and said second retention means being selectively rotatable to a position releasing clamping engagement of said rodlike member.

2. Apparatus as in claim 1, in which said plate means is generally rectangular and formed with a shoulder extending transversely of said edge spaced from said case surface, said shoulder separating the plate means into two generally parallel planes.

3. Apparatus as in claim 1, in which said plate means includes a generally rectangular metal plate affixed to said luggage case surface with an edge overlying a well formed in said case surface.

4. Apparatus as in claim 1, in which the outer surface of said luggage case includes a pair of generally parallel straight-line grooves into which a pair of rack support members are fittingly received.

5. Apparatus as in claim 1, in which said second retention means includes a stanchion carried by said rack having a slot dimensioned to fittingly receive said rodlike member therein, a rocker plate mounted for pivotal movement from a first position where parts of said rocker plate are immediately opposite the stanchion slot obstructing removal of said rodlike member from said slot to a second position enabling removal of said rodlike member from said slot.

6. Apparatus as in claim 5, in which there is further provided a spring operatively connected to the rocker plate providing resilient opposition to movement of the rocker plate from its first position to its second position.

7. Apparatus as in claim 5, in which there is provided a further rocker plate interconnected with said first recited rocker plate such that movements of the further rocker plate from a first position to a second position move the first recited rocker plate from its said first position to its said second position.

8. Apparatus as in claim 7, in which a spring resiliently interconnects the two rocker plates such that the first recited rocker plate is movable from its respective first position to its respective second position while said further rocker plate maintains its first position.

9. Apparatus as in claim 7, in which there is further provided locking means mounted on said further rocker plate for selectively locking said further rocker plate to the rack against movement between its first and second positions.

10. Apparatus as in claim 1, in which said rack includes first and second tubes arranged in spaced parallel relationship, stanchions at the ends of said tubes for securing the same to a vehicle surface, and a plurality of supports transversely extending between said tubes and interconnecting the tubes into a unitary construction, said first and second retention means being mounted on the respective first and second tubes.

11. Apparatus as in claim 1, in which the luggage case has a molded side wall and a molded top wall extending at substantially ninety degrees to said side wall, both said top and side walls being molded to include respective wells therein, said plate means being located in the side wall well, and said rodlike member being located in the top wall well.

12. A luggage case having a side wall, end walls and a top wall, comprising:

the top wall having a well formed therein lying substantially midway between the case end walls;

the side wall having a pair of straight-line grooves formed therein of substantially rectangular cross-section, said grooves extending normally to the top wall and being laterally spaced from one another;

the side wall further including a well formed intermediate the grooves;

first and second mounting means received in the side wall and top wall wells respectively for cooperating with first and second retention means on a vehicle mounted rack for releasably retaining rack support means of similar dimensions within the case grooves.

13. A luggage case as in claim 12, in which said case top and side walls are constructed of molded synthetic plastic material.

14. A luggage case as in either of claims 12 or 13, in which the first mounting means has a platelike part spaced outwardly from the well bottom in which it is located.

15. A luggage case as in claim 12, in which the said second mounting means includes a base affixed to the case top wall defining the well bottom, said base having a raised ridge along one outer edge and a generally rodlike member along an opposite outer base edge, said ridge and rodlike member being substantially parallel.

16. Apparatus for releasably securing a luggage case onto a framelike rack adapted to be carried by a vehicle, comprising in combination:

first means mounted onto an outer surface of the luggage case;

second means mounted on the luggage case outer surface and spaced along said surface from said first mounted means; and the rack including, first retention means with an opening through which the first mounted means is received, and second retention means clampingly engaging the second mounted means, and said second retention means being selectively movable to a position releasing clamping engagement of said second mounted means.

17. Apparatus as in claim 16, in which said first mounted means is a generally rectangular plate and formed with an intermediate shoulder providing an edge spaced from said case surface, and said first retention means opening is adaptable to receive the plate edge therein.

18. Apparatus as in claim 16, in which said first mounted means includes a generally rectangular metal plate affixed to said luggage case surface with an edge spaced outwardly from said case surface, and said first retention means opening receives said edge therein.

19. Apparatus as in claim 16, in which said second retention means includes a stanchion carried by said rack having a slot dimensioned to fittingly receive said second mounted means therein, a back rocker plate mounted for pivotal movement from a first position where parts of said rocker plate are immediately opposite the stanchion slot obstructing removal of said second mounted means from said slot to a second position enabling removal of said second mounted means from said slot, a spring operatively connected to the back rocker plate provides resilient opposition to movement of the rocker plate from its first position to its second position.

20. Apparatus as in claim 19, in which a front rocker plate is interconnected with said back rocker plate interconnected such that movements of the front rocker plate from a first position to a second position move the first recited rocker plate from its said first position to its said second position.

* * * * *